April 29, 1924.
L. DINESEN
MILKING APPARATUS
Filed Feb. 14, 1921   4 Sheets—Sheet 3
1,491,792
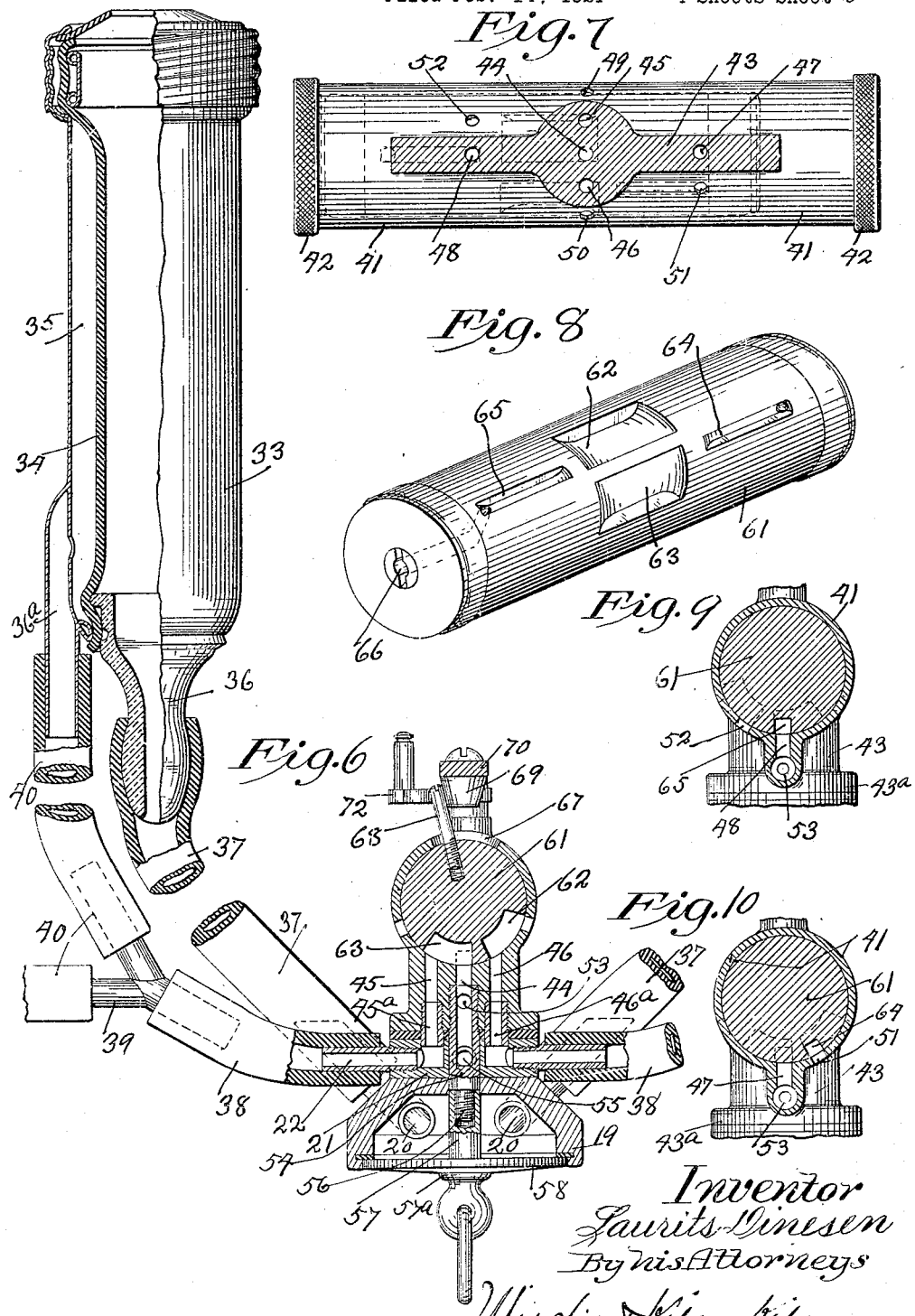

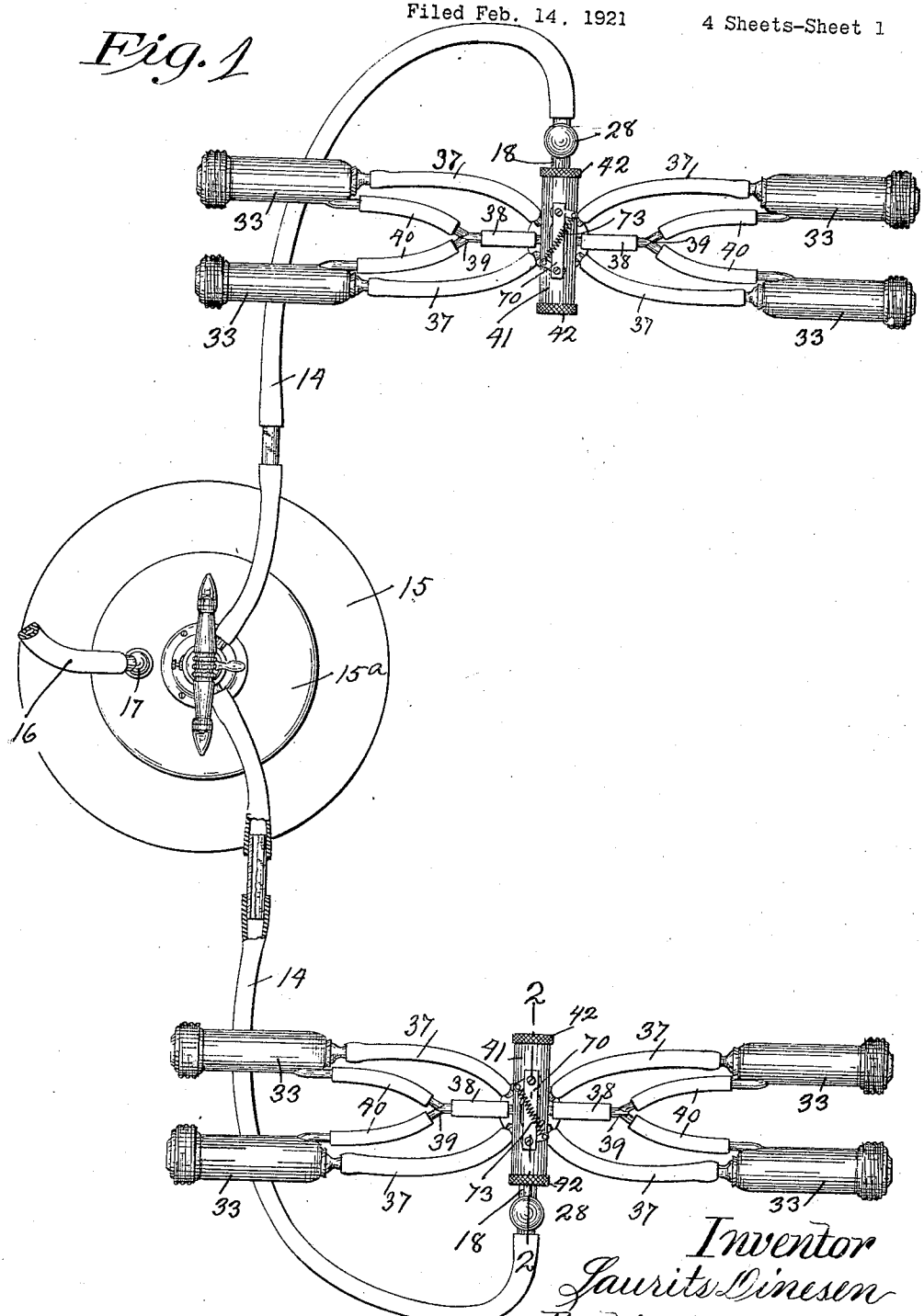

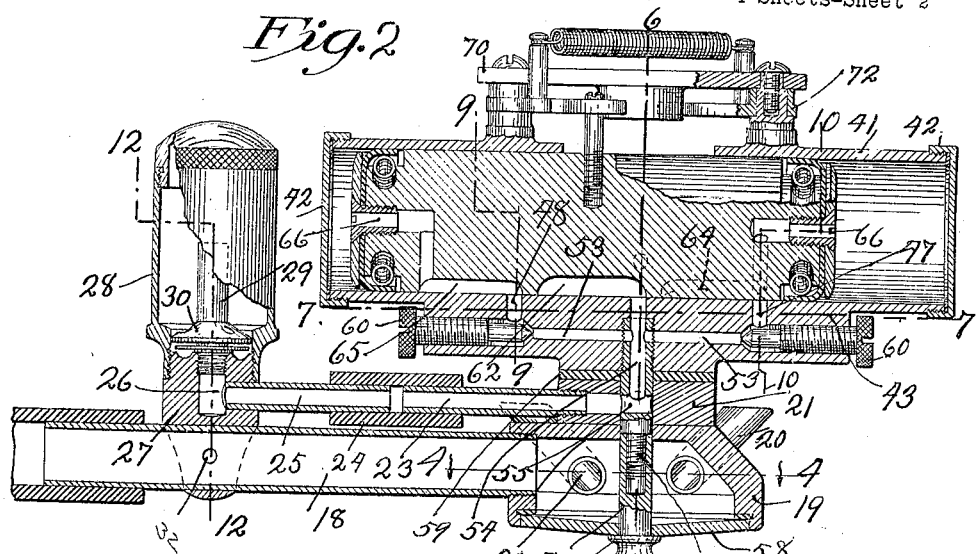
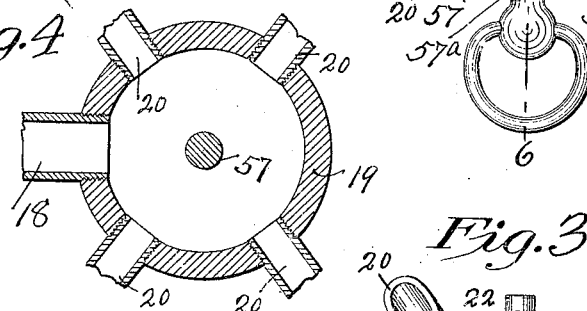
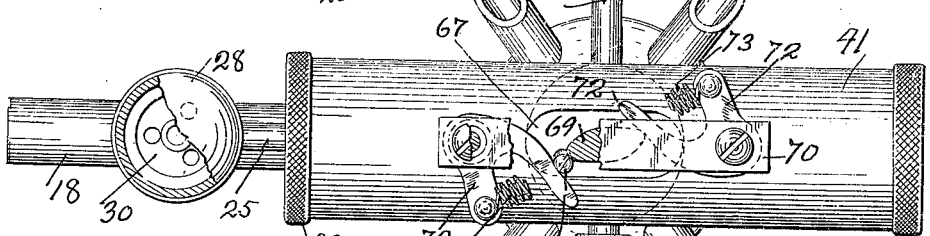
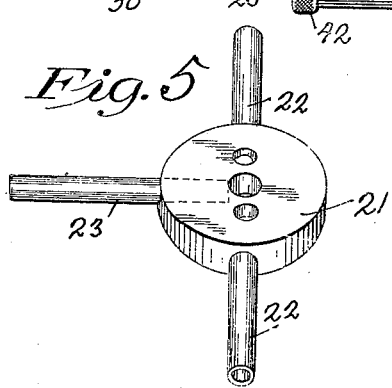

April 29, 1924.                                                                      1,491,792
L. DINESEN
MILKING APPARATUS
Filed Feb. 14, 1921           4 Sheets-Sheet 4
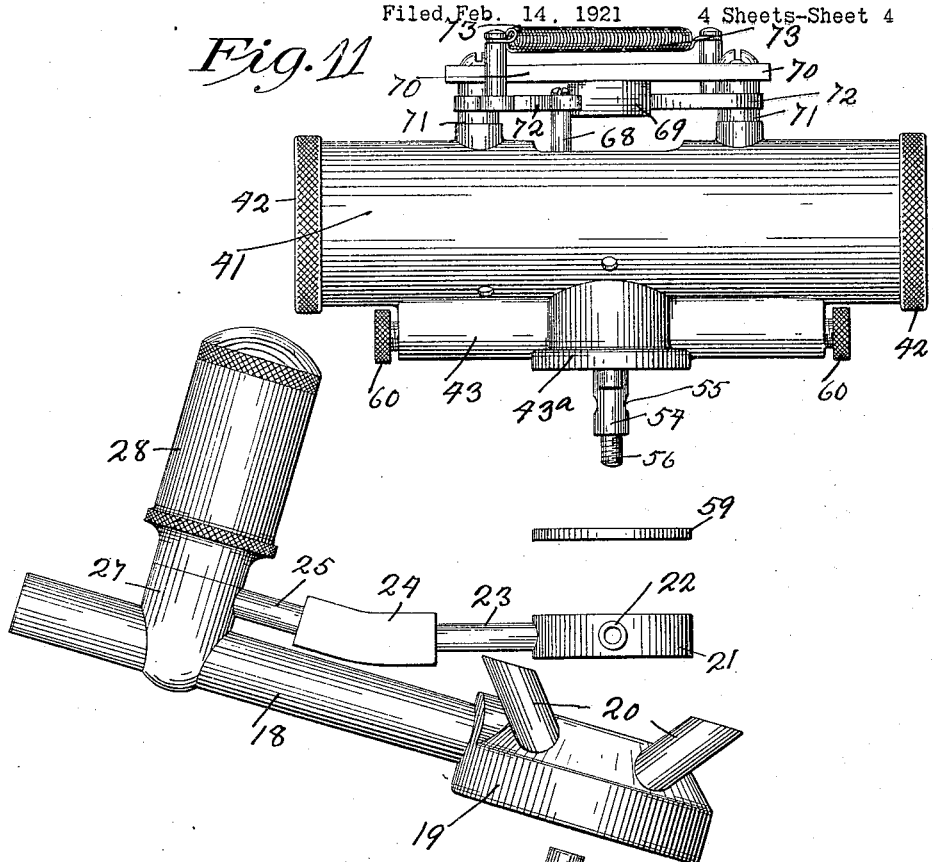
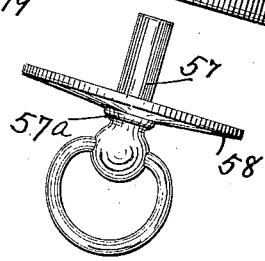
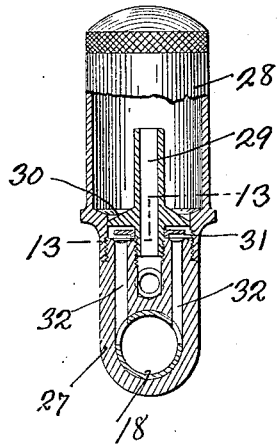
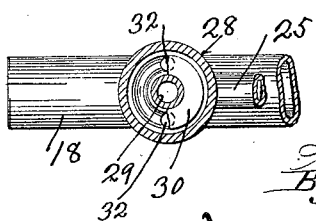
Inventor
Laurits Dinesen
By his Attorneys Patented Apr. 29, 1924.

1,491,792

UNITED STATES PATENT OFFICE.

LAURITS DINESEN, OF MINNEAPOLIS, MINNESOTA.

MILKING APPARATUS.

Application filed February 14, 1921. Serial No. 444,873.

*To all whom it may concern:*

Be it known that I, LAURITS DINESEN, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

My present invention provides an improved milking apparatus, and, generally stated, it consists of the novel devices and combinations of devices hereinafter described and defined in the claims. Certain features herein employed are disclosed and broadly claimed in my prior Patent #1,117,169, of date November 17, 1914, and other features are disclosed and claimed broadly in my pending application Serial Number 287,256, filed of date April 3, 1919. The present invention involves a highly important reorganization or improvement on the mechanisms of the prior patent and application, and also includes other important novel features, herein also claimed, as will hereinafter appear.

A commercial form of the present improved apparatus is illustrated in the accompanying drawings, wherein like characters indicate like parts throughout the several views.

Referring to the drawings:

Fig. 1 is a plan view illustrating the apparatus and showing what may be treated as a one-unit or rather as a sort of double unit consisting of one milk pail or receptacle, two groups of teat cups, and a pulsator for each group of teat cups, said unit being adapted to simultaneously milk two cows;

Fig. 2 is an enlarged vertical section taken on the line 2—2 of Fig. 1, some parts being shown in full;

Fig. 3 is a plan view of the parts shown in Fig. 2;

Fig. 4 is a horizontal section on the line 4—4 of Fig. 2;

Fig. 5 is a perspective showing a so-called air-line coupler head removed from working position;

Fig. 6 is a transverse vertical section taken on the line 6—6 of Fig. 2, some parts being shown in full and showing also one of the teat cup connections;

Fig. 7 is a detail in horizontal section taken approximately on the line 7—7 of Fig. 2, looking upward or at the bottom of the pulsator cylinder;

Fig. 8 is a perspective showing the pulsator piston;

Fig. 9 is a fragmentary transverse section taken on the irregular line 9—9 of Fig. 2;

Fig. 10 is a fragmentary transverse section taken on the irregular line 10—10 of Fig. 2;

Fig. 11 is a side elevation showing the pulsator, air-line coupler head, milk-line coupler head and certain other elements pulled apart or separated;

Fig. 12 is a transverse section taken on the irregular line 12—12 of Fig. 2; and Fig. 13 is a horizontal section taken on the irregular line 13—13 of Fig. 12.

For each group of teat cups there is a single flexible tube, to wit: a combined air and milk tube 14, which tubes are connected to the interior of the milk pail or receptacle 15 through a pail cover 15ª. Partial vacuum will be maintained in the pail by suitable means such as an air tube 16 connected to a nipple 17 on the pail cover and extended to a vacuum tank or the like, not shown. As a major feature of the present invention, I provide a pulsator mechanism, which, irrespective of its particular location in the system, involves highly important novel features, but the location of which, hereinafter described, nevertheless produces highly important results.

In the drawings, a double unit milking apparatus, adapted to simultaneously milk two cows, is illustrated, but for the purposes of this case, it will be sufficient to describe but one group of teat cups and one co-operating pulsator.

The extended end of the flexible milking tube, or combined milk and air tube 14, is connected to one end of a metallic coupling tube 18, to the extended end of which latter is rigidly secured a hollow so-called milk-line coupler head 19, which, as shown, has four upwardly radiating nipples 20.

The numeral 21 indicates a hollow annular so-called air-line coupler head, which, as preferably designed, is adapted to be assembled flatwise against and concentric with the top of the milk-line coupler head 19. This coupler head 21 has two radially projecting nipples 22 and a radially projecting tube 23, which latter, by a short flexible tube 24, is detachably coupled to a tube or long nipple 25 that leads into the interior chamber 26 of a metal block 27 rigidly secured on the coupling tube 18. This block 27, at its upper end, has a threaded boss on which the lower end of an equalizing chamber 28 is detachably but rigidly secured with an air tight joint, preferably by threaded engagement. Secured to and rising from the block 27 and forming an upward extension of the chamber 26 is a nozzle tube 29 that has an outstanding annular flange 30 provided with one or more air passages. Mounted to slide on the tube 29, between the block 27 and the perforated flange 30, (see Figs. 2 and 12), is an annular valve 31 that is normally gravity-held in a lowered position so as to leave the passages in said flange 30 open. Under suction or partial vacuum in the chamber 28, said valve 31 will be raised and will close the air passages in the flange 30. The block 27, eccentric to its central chamber, is provided with one or more small air ducts 32 that lead to the interior of the coupling tube 18.

The milk and air-line coupler heads, above described, are particularly designed and arranged for use in connection with double chamber teat cups such as disclosed and claimed in my prior Patent 1,201,808, of October 17, 1916, but also shown in my pending application above identified. As shown, said teat cups comprise outer metallic shells 33 and flexible tubular inner walls 34, said shell and tube being spaced to form an annular air chamber 35. The central or teat chamber of each cup is provided with a projecting nipple 36, and each annular air chamber 35 is provided with a coupling nipple 36$^a$ applied to the shell 33. Flexible rubber tubes 37 connect the nipples 20 with the milk-line coupler head 19 to the respective teat chamber nipples 36 of the four teat cups of the group.

The nipples 22, which project at diametrically opposite sides of the air-line coupler head 21, are connected to short flexible rubber tubes 38, which, by tubular Y-couplings 39, are connected to flexible rubber tubes 40, which, in turn, are connected one to each of the teat cup air-conducting nipples 36$^a$. In this way, it will be noted that the nipple 22, at one side of the coupler head 21, is connected to the air chambers of two teat cups of the group, and the nipple 22, that is at the opposite side of said coupler head, is independently connected to the air chambers of the other two teat cups of the group. This arrangement, as will presently appear, is one of the features that makes possible alternations of the milking pulsations or actions in different members of the teat cups of the same group, under control from a pulsator having a piston that is mounted to reciprocate and oscillate on the general plan broadly claimed in my prior Patent #1,117,169.

The improved pulsator, as illustrated, comprises as follows: A cylinder 41, having detachable heads 42, is cast integral with a base portion 43 that is formed with ports 44, 45, 46, 47 and 48 that open into the cylinder. The ports 44, 45 and 46 are aligned with each other transversely of the cylinder and also with atmospheric ports 49 and 50 formed in the cylinder on opposite sides of the base portion 43. The ports 47 and 48, in a direction longitudinally of the cylinder, are spaced far apart on opposite sides of the row of intermediate ports just noted, and said ports 47 and 48 are transversely aligned with ports 51 and 52 that open through the cylinder to the atmosphere on opposite sides of said base 43.

The two cylinder ports 47 and 48 are connected to air channels 53 formed in the base 43 and communicating with the interior of a tubular stem 54 that is screwed into said base axially through a central circular bearing surface 43$^a$ of said base. The interior of this tubular stem 54 will communicate with the inner chamber of the air coupler head 21 when the latter is applied on said stem, as shown in Fig. 2, through a diametric air passage 55. The extreme lower end of said stem 54 is closed but reduced and threaded to form a trunnion 56, onto which a nutacting or internally threaded clamping screw 57 is adapted to be screwed. The clamping screw 57 has a head flange 57$^a$ for engagement with a disk-like cover 58 that fits the bottom of the milk-line coupler head 19 with an air tight joint and affords a detachable bottom thereto. Here it will be noted that said cover 58 and the top of said head 19 have axial perforations through which the clamping screw 57 may be passed to assemble the parts as shown in Figs. 1 and 6. Here note also that the opposing faces of the elements 43$^a$, 21 and 19 are flat so that they will closely engage and form tight joints. Preferably, a pliable washer 59 is interposed between said elements 43$^a$ and 21. By reference to Fig. 2, it will also be noted that, at the junction of the cylinder ports 47 and 48 with the cooperating air passage 53, the flow of air may be regulated by adjustments of needle valves 60 that work with threaded engagement through the ends of the base 43.

The reciprocating oscillatory piston 61, that works in the cylinder 41, is provided at its intermediate portion with two closely adjacent ports 62 and 63. On opposite sides of the ports 62 and 63, in a direction longitudinally of the piston, said piston is provided with long narrow air ports 64 and 65 that are circumferentially offset on opposite sides of the web between the ports 62 and 63. These air ports 64 and 65 are connected through the ends of the piston by air passage 66.

Here attention is called to the fact that the ports 62 and 63, in a direction longitudinally of the piston, are of such length that they never move endwise beyond the intermediate transverse row of ports 44, 45, 46, 49 and 50, and, likewise, that the ports 61 and 65 are of such length that they never move endwise beyond the co-operating ports 47—51 and 48—52. The importance of this relative arrangement of ports will appear in the description of the operation.

In its top, the cylinder 41 has a quite large opening 67, which, however does not act as a port at any time, but simply affords clearance for a cam pin 68 secured to and projecting radially upward from the piston 61. The cam pin 68 engages with and is adapted to move completely around a so-called cam block 69 shown as formed on a raised bar 70 rigidly secured to short posts or studs 71 formed on top of the cylinder 41.

Reversely arranged yieldingly held shipper cams or arms 72 are pivoted on the posts or studs 71. The pin-engaging ends of these cam arms 72 are yieldingly pressed toward the beveled ends of the cam block 69, by a coiled spring 73 attached to the outer ends of said cam arms, (see particularly Figs. 2 and 3). The ports 45 and 46 are constantly in communication with the interior of coupling head 21, through the nipples $45^a$ and $46^a$.

Operation.

A substantially constant partial vacuum will be maintained in the milk can 15. Hence, there will be a continuous suction in the combined milk and air tube 14 and this suction or partial vacuum, with the arrangement illustrated, will be continually effective on the inner chambers of the teat cups of the group, through the coupling tube 18, nipples 20 and branch milk tubes 37.

However, in the annular chambers 35 of the teat cups, pressure pulsations will be produced, but these pressure pulsations will be alternated in certain teat cups, in respect to certain other teat cups. These alternated pressure pulsations are controlled by combined reciprocary and oscillatory movements of the pulsator piston 61. The piston itself is moved by the combined action of suction and atmospheric pressure alternately admitted to the opposite ends of the cylinder through ports controlled by the compound movements of said piston itself. These actions, traced and detailed, are produced as follows:

The partial vacuum that is constantly maintained in the coupling tube 18, in the equalizing chamber 28 and in the sectional tube 23—24—25, is constantly rendered effective in the several cylinder ports 44, 47 and 48. When the piston 61 is approximately at its extreme position toward the left in respect to Figs. 2, 3 and 7, for example, the following conditions will be established, to wit: ($a$) The left-hand piston port 65 will be in communication with the cylinder port 48 and the left-hand end of the cylinder will then be subject to suction or partial vacuum, through said registering ports and the left-hand piston passage 66. ($b$) The right-hand piston port 64 will be in registration with the cylinder port 51, so that atmospheric pressure will then be rendered effective in the right-hand end of the cylinder and will exert a force sufficient to drive the piston toward the left. ($c$) The intermediate piston port 63 will connect the cylinder port 44 to the cylinder port 45 so as to render partial vacuum effective in the outer chambers 35 of the two left-hand teat cups, thereby causing expansion of the tubular walls or diaphragms 34 thereof. ($d$) The piston port 62 will connect the cylinder ports 46 and 50, thereby admitting atmospheric pressure to the outer air chambers 35 of the two right-hand teat cups, causing contraction of the tubular diaphragms 34 of said right-hand cups. These conditions ($a$), ($b$), ($c$) and ($d$) were, in fact, established when the piston was substantially at the limit of its right-hand movement, as will presently more clearly appear.

When the piston is in the left-hand position above noted, its cam pin 68 will be thrust against the left-hand yielding shipper cam arm 72, the spring 73 will be put under increased strain and, as the piston moves a little further to the left, said spring, acting through said left-hand cam arm, will force the cam pin 68 to the other side of the cam block 69, thereby oscillating the piston 61 and establishing a reversed relation of piston and cylinder ports in which the following conditions will simultaneously exist, to wit: ($a^1$) The right-hand piston port 64 will be in communication with the cylinder port 47 and the right-hand end of the cylinder will then be subject to suction or partial vacuum through said registering ports and the right-hand piston passage 66. ($b^1$) The left-hand piston port 65 will be in registration with the cylinder port 52 so that atmospheric pressure will then be rendered effective in the left-hand end of the cylinder and will exert a force sufficient to drive the piston toward the right. ($c^1$) The intermediate piston port 62 will then connect the cylinder port 44 to the cylinder port 46 so as to render partial vacuum effective in the outer chambers 35 of the two right-hand teat cups, thereby causing expansion of the tubular walls or diaphragms 34 thereof. ($d^1$)

The piston port 63 will then connect the cylinder ports 45 and 49, thereby admitting atmospheric pressure to the outer chambers 35 of the two left-hand teat cups, causing contraction of the tubular diaphragms 34. These conditions ($a^1$), ($b^1$), ($c^1$) and ($d^1$) will continue substantially throughout the movement of the piston from the left toward the right. At approximately the limit of the movement of said piston toward the right, its cam pin 68 comes against the right-hand shipper cam 72, and the latter, under the action of its spring 73, will force said cam pin toward the observer, (Fig. 3), and thereby oscillate the piston so as to again establish the conditions designated as ($a$), ($b$), ($c$) and ($d$). Thus, as is evident, the piston will continue to reciprocate and oscillate, performing its several functions of producing pulsations in the teat cups and controlling partial vacuum and atmospheric pressure to produce the reciprocating piston movements. The speed at which the piston will move, under a constant or unvarying partial vacuum in the source, such as the pail or milk receptacle, may be varied by adjustments of the needle valves or choke devices 60.

In the preferred arrangement of the apparatus described, the milk-line coupler head, which has nipples for coupling milk tubes thereto, is an element capable of complete separation from the air-line coupler head, which has nipples for connection to the tubes, and both of these elements are capable of complete separation from the pulsator. This facilitates cleaning as well as the manufacture of said elements. Also, when the head or cover 58 is removed from the milk-like coupling head 19, the interior of the latter is opened up so that it may be easily cleaned and sterilized.

What I claim is:

1. A pulsator comprising a cylinder and a piston having co-operating ports and means for reciprocating said piston and for oscillating the same, a suction conduit connected to certain of said ports and certain other of said ports being arranged for connection to different teat cups of the same group, said ports being further arranged to alternate the pulsating actions in some of said teat cups in respect to pulsations in other teat cups.

2. A pulsator comprising a cylinder and a piston having co-operating ports and means for reciprocating said piston and for oscillating the same, a suction conduit connected to certain of said ports and certain other of said ports being arranged for connection to different teat cups of the same group, said ports being further arranged to alternate the pulsating actions in some of said teat cups in respect to pulsations in other teat cups, said ports, under oscillations of said piston, co-operating to control reciprocations of said piston.

3. In a milking apparatus, the combination with a group of teat cups having central teat chambers and outer pulsation chambers, of a pulsator comprising a cylinder and a piston, said piston having a reciprocating and oscillatory movement in said cylinder, a suction pipe connected to certain of the cylinder ports and certain other cylinder ports being connected to the pulsation chambers of different teat cups of the same group, said ports and piston being arranged to connect the pulsation chambers of different teat cups alternately to said suction tube and the atmosphere in reverse order.

4. In a milking apparatus, the combination with a group of teat cups having central teat chambers and outer pulsation chambers, of a pulsator comprising a cylinder and a piston, said piston having a reciprocating and oscillatory movement in said cylinder, a suction pipe connected to certain of the cylinder ports and certain other cylinder ports being connected to the pulsation chambers of different teat cups of the same group, said ports and piston being arranged to connect the pulsation chambers of different teat cups alternately to said suction tube and the atmosphere in reverse order, and to alternately connect the opposite ends of said cylinder to said suction conduit and to the atmosphere in reverse order.

5. A pulsator comprising a cylinder and piston having co-operating ports, a suction pipe connected to certain of the cylinder ports, certain of the cylinder ports being open to the atmosphere and certain other cylinder ports being arranged for connection to a teat cup, and means for oscillating said piston at the limit of its reciprocating movements, the said ports, under oscillations of said piston, co-operating to control reciprocations of said piston, and said ports being arranged to reversely alternate the pulsating actions in different teat cups of the group.

6. In a milking apparatus, the combination with a milk receptacle and a suction tube, of a group of teat cups and a pulsator at the extended end of said suction tube, said pulsator comprising a cylinder and a piston having ports and means for reciprocating said piston and for oscillating the same, certain of said cylinder ports being connected to said suction tube and certain other cylinder ports being connected to said teat cups.

7. In a milking apparatus, the combination with a milk receptacle in which a partial vacuum may be maintained, and a flexible suction tube extended from said receptacle, of a group of teat cups and a pulsator at the outer end of said suction tube, said pulsator comprising a cylinder and a piston having co-operating ports, certain of said cylinder ports being open to the atmosphere and certain other cylinder ports being connected to said teat cups and certain thereof being connected to said suction tube, and means for oscillating said piston approximately at the limits of its reciprocating movements, said ports and oscillations of said piston co-operating to control reciprocations of said piston and to produce pressure pulsations in said teat cups.

8. In a milking apparatus, the combination with a milk receptacle in which a partial vacuum may be maintained, and a flexible suction tube extended from said receptacle, of a group of double chamber teat cups and a pulsator at the outer end of said suction tube, said pulsator comprising a cylinder and a piston having co-operating ports, certain of said cylinder ports being open to the atmosphere and certain other cylinder ports being connected to said teat cups and certain thereof being connected to said suction tube, and means for oscillating said piston approximately at the limits of its reciprocating movements, said ports and oscillations of said piston co-operating to control reciprocations of said piston and to produce pressure pulsations in said teat cups.

In testimony whereof I affix my signature.

LAURITS DINESEN.